United States Patent
Hong

(10) Patent No.: US 12,477,614 B2
(45) Date of Patent: Nov. 18, 2025

(54) METHOD FOR CHANGING RRC STATE, COMMUNICATION APPARATUS, AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 582 days.

(21) Appl. No.: 17/916,311

(22) PCT Filed: Apr. 2, 2020

(86) PCT No.: PCT/CN2020/083013
§ 371 (c)(1),
(2) Date: Sep. 30, 2022

(87) PCT Pub. No.: WO2021/196133
PCT Pub. Date: Oct. 7, 2021

(65) Prior Publication Data
US 2023/0164868 A1 May 25, 2023

(51) Int. Cl.
*H04W 76/27* (2018.01)
*H04W 52/02* (2009.01)

(52) U.S. Cl.
CPC ....... *H04W 76/27* (2018.02); *H04W 52/0235* (2013.01)

(58) Field of Classification Search
CPC ............. H04W 76/27; H04W 52/0235; H04W 52/0212; H04W 52/0229; Y02D 30/70
See application file for complete search history.

(56) References Cited

U.S. PATENT DOCUMENTS

| | | |
|---|---|---|
| 2017/0272921 A1 | 9/2017 | Kim et al. |
| 2020/0100174 A1 | 3/2020 | Kim et al. |
| 2021/0307100 A1* | 9/2021 | Talebi Fard .......... H04W 76/18 |
| 2023/0007722 A1* | 1/2023 | Baek ..................... H04W 76/27 |
| 2023/0021290 A1* | 1/2023 | Guo ........................ H04W 8/20 |
| 2023/0164871 A1* | 5/2023 | Jung ..................... H04W 24/08 370/328 |
| 2024/0137817 A1* | 4/2024 | Da Silva ................. H04W 8/08 |
| 2024/0314766 A1* | 9/2024 | Kim ....................... H04W 76/14 |

FOREIGN PATENT DOCUMENTS

| | | |
|---|---|---|
| CN | 101917774 A | 12/2010 |
| CN | 103702376 A | 4/2014 |
| CN | 107249221 A | 10/2017 |

(Continued)

OTHER PUBLICATIONS

Chinese Office Action issued on Sep. 30, 2022 for Chinese Patent Application No. 202080000647.8.

*Primary Examiner* — Joseph E Avellino
*Assistant Examiner* — Anindita Sen
(74) *Attorney, Agent, or Firm* — Volpe Koenig

(57) ABSTRACT

A method for changing an RRC state, performed by a terminal and including: sending first information to a base station, where the first information at least includes request information configured to request a change from a radio resource control (RRC) connected state to an RRC disconnected state; and the RRC disconnected state includes an RRC idle state or an RRC inactive state.

19 Claims, 12 Drawing Sheets

(56) References Cited

FOREIGN PATENT DOCUMENTS

| | | |
|---|---|---|
| CN | 110149728 A | 8/2019 |
| CN | 110521230 A | 11/2019 |
| CN | 110574410 A | 12/2019 |
| EP | 3145228 A1 | 3/2017 |
| KR | 20180105410 A | 9/2018 |
| WO | 2018/121382 A1 | 7/2018 |
| WO | 2018/126547 A1 | 7/2018 |

* cited by examiner

Base station   Terminal

Step 21, send first information to a base station, the first information at least including request information configured to request a change from a radio resource control (RRC) connected state to an RRC disconnected state, and the RRC disconnected state including an RRC idle state or an RRC inactive state

METHOD FOR CHANGING RRC STATE, COMMUNICATION APPARATUS, AND STORAGE MEDIUM

CROSS-REFERENCE TO RELATED APPLICATION

The present application is a U.S. National Stage of International Application No. PCT/CN2020/083013, filed on Apr. 2, 2020, the contents of all of which are incorporated herein by reference in their entirety for all purposes.

BACKGROUND

Mobile communication has experienced a rapid development from a voice service to a mobile bandwidth data service, which has not only changed people's lifestyle, but also greatly promoted the development of society and the economy. As the two main driving forces for future development of mobile communication, mobile Internet and Internet of Things provide broad application scenarios for the 5th-generation (5G) mobile communication. At the same time, the thousand-fold increase in data traffic, hundreds of billions of device connections, and diversified business demands will all pose severe challenges to 5G system design. 5G will meet people's needs for ultra-high traffic density, ultra-high connection density, and ultra-high mobility, and can provide users with extreme service experiences such as high-definition videos, virtual reality, augmented reality, cloud desktop, and online games. 5G will penetrate into the Internet of Things and other fields, deeply integrate with industrial facilities, medical instruments, transportation, etc., to fully realize the "Internet of Everything", and effectively meet the information service needs of vertical industries such as industry, medical care, and transportation. 5G will also greatly improve the energy consumption and cost efficiency of network construction and operation, comprehensively enhance service innovation capabilities, and expand the space of the mobile communication industry.

SUMMARY

The disclosure relates to, but is not limited to, the field of wireless communication, in particular to a method and device for changing an RRC state, a communication apparatus, and a storage medium.

According to a first aspect of the example of the disclosure, there is provided a method for changing an RRC state, and the method is performed by a terminal and includes:
sending first information to a base station, the first information at least including request information configured to request a change from a radio resource control (RRC) connected state to an RRC disconnected state, and the RRC disconnected state including an RRC idle state or an RRC inactive state.

According to a second aspect of the example of the disclosure, there is further provided a method for changing an RRC state, and the method is performed by a base station and includes:
receiving first information sent by a terminal, the first information at least including request information for the terminal to request a change from a radio resource control (RRC) connected state to an RRC disconnected state, and the RRC disconnected state including an RRC idle state or an RRC inactive state.

According to a third aspect of the example of the disclosure, there is further provided a device for changing an RRC state which is applied to a terminal, and the device includes a first sending module.

The first sending module is configured to send first information to a base station, and the first information at least includes request information configured to request a change from a radio resource control (RRC) connected state to an RRC disconnected state; and the RRC disconnected state includes an RRC idle state or an RRC inactive state.

According to a fourth aspect of the example of the disclosure, there is further provided a device for changing an RRC state which is applied to a base station, and the device includes a third receiving module.

The third receiving module is configured to receive first information sent by a terminal, and the first information at least includes request information for the terminal to request a change from a radio resource control (RRC) connected state to an RRC disconnected state; and the RRC disconnected state includes an RRC idle state or an RRC inactive state.

According to a fifth aspect of the example of the disclosure, there is further provided a communication apparatus, including:
an antenna;
a memory; and
a processor, connected to the antenna and the memory, respectively. The processor is configured to control the antenna to transceive a wireless signal by executing an executable program stored in the memory, and can execute the steps of the method provided by any of the foregoing technical solutions.

According to a sixth aspect of the example of the disclosure, there is further provided a non-transitory computer-readable storage medium. The non-transitory computer-readable storage medium stores executable programs, and the executable programs implement the steps of the method provided by any of the foregoing technical solutions when being executed by a processor.

DETAILED DESCRIPTION

Examples will be described in detail here, and instances are shown in the accompanying drawings. Where the following description involves the accompanying drawings, unless otherwise indicated, the same numbers in different accompanying drawings indicate the same or similar elements. The implementations described in the following examples do not represent all implementations consistent with the disclosure examples. Instead, they are merely instances of devices and methods consistent with some aspects of the examples of the disclosure as detailed in the appended claims.

The terms used in the examples of the disclosure are for the purpose of describing specific examples, and are not intended to limit the examples of the disclosure. The singular forms "one" and "the" used in the examples of the disclosure and the appended claims are also intended to include the majority forms unless the context clearly indicates other meanings. It should be understood that the term "and/or" as used here refers to and includes any or all possible combinations of one or more associated listed items.

It should be understood that although the terms first, second, third, etc. may be used to describe various information in the examples of the disclosure, such information should not be limited to these terms. These terms are merely used to distinguish the same type of information from each other. For example, without departing from the scope of the examples of the disclosure, first information may also be referred to as second information, and similarly, the second information may also be referred to as the first information. Depending on the context, the words "if" and "as if" as used here can be interpreted as "at the time" or "when" or "in response to determining".

Figure 1:
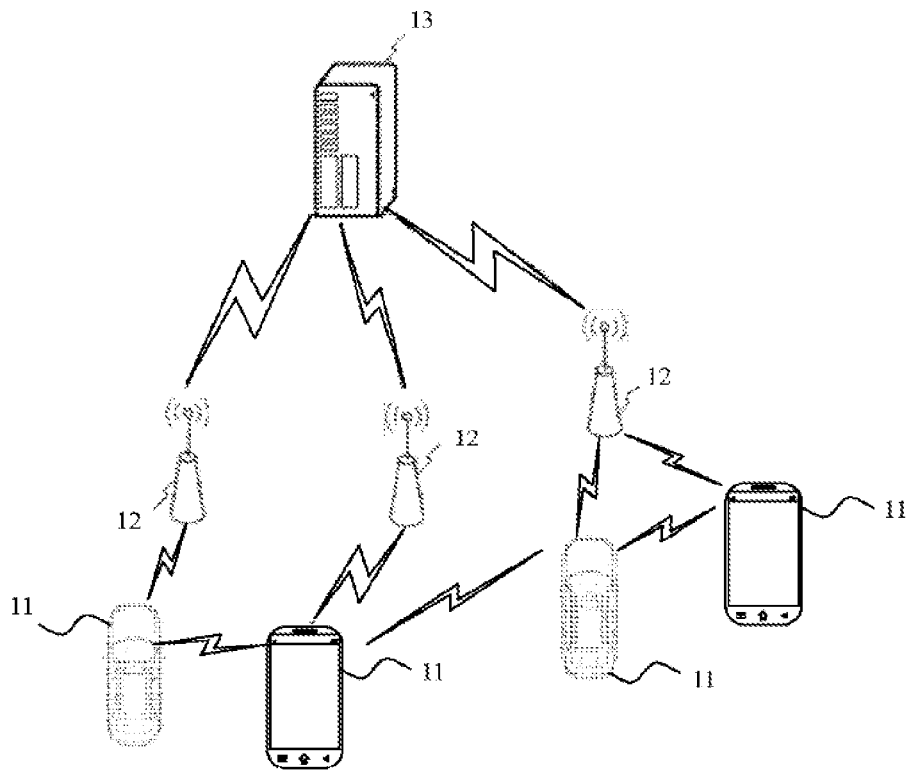
FIG. 1 is a schematic structural diagram of a wireless communication system according to an example of the disclosure.

Please refer to FIG. 1, which illustrates a schematic structural diagram of a wireless communication system according to an example of the disclosure. As shown in FIG. 1, the wireless communication system is a communication system based on a cellular mobile communication technology. The wireless communication system may include more than one terminal 11 and more than one base station 12.

The terminal 11 may be a device that provides voice and/or data connectivity to a user. The terminal 11 may communicate with one or more core networks via a Radio Access Network (RAN). The terminal 11 may be an Internet of Things terminal, such as a sensor device, a mobile phone (or referred to as a "cellular" phone), and a computer having an Internet of Things terminal, for example, a stationary, portable, pocket-size, handheld, computer-built-in, or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Or, the terminal 11 may also be a device of an unmanned aerial vehicle. Alternatively, the terminal 11 may also be a vehicle-mounted device, for example, a trip computer with a wireless communication function or a wireless communication device externally connected with a trip computer. Alternatively, the terminal 11 may also be a roadside equipment, such as a street lamp, a signal lamp or other roadside equipment with a wireless communication function.

The base station 12 may be a network-side device in the wireless communication system. The wireless communication system can be a 4th generation mobile communication (4G) system, also known as a long-term evolution (LTE) system. Alternatively, the wireless communication system may also be a 5G system, also known as a new radio (NR) system or a 5G NR system. Alternatively, the wireless communication system may also be a next-generation system of the 5G system. An access network in the 5G system can be called as New Generation-Radio Access Network (NG-RAN). Or, the wireless communication system may be a machine-type communication (MTC) system.

The base station 12 may be an evolved base station (eNB) adopted in the 4G system. Alternatively, the base station 12 may also be a base station using a centralized distributed architecture (gNB) in the 5G system. In the case that the base station 12 adopts the centralized distributed architecture, the base station 12 generally includes a central unit (CU) and at least two distributed units (DUs). The central unit is provided with protocol stacks of a packet data convergence protocol (PDCP) layer, a radio link control (RLC) protocol layer, and a media access control (MAC) layer. The distributed unit is provided with a protocol stack of a physical (PHY) layer. The specific implementation of the base station 12 is not limited by the examples of the disclosure.

Wireless connection can be established between the base station 12 and the terminal 11 through a wireless air interface. In various implementations, the wireless air interface is a wireless air interface based on a 4th generation mobile communication network technology (4G) standard. Alternatively, the wireless air interface is a wireless air interface based on a 5th generation mobile communication network technology (5G) standard, for example, the wireless air interface is a new radio. Alternatively, the wireless air interface may also be a wireless air interface based on a next generation mobile communication network technology standard of 5G.

In some examples, an End-to-End (E2E) connection may also be established between the terminals 11, for example, vehicle-to-vehicle (V2V) communication, vehicle to infrastructure (V2I) communication, vehicle to pedestrian (V2P) communication, and the like in vehicle to Everything (V2X).

In some examples, the wireless communication system may further include a network management device 13.

The more than one base station 12 is respectively connected with the network management device 13. The network management device 13 may be a core network device in the wireless communication system. For example, the network management device 13 may be a mobility management entity (MME) in an evolved packet core (EPC) network. Alternatively, the Or, the network management device may further be other core network devices, such as a serving gate-way (SGW), a public data network gate-way (PGW), a policy and charging rules function (PCRF) unit, a home subscriber server (HSS), or the like. The implementation form of the network management device 13 is not limited in the examples of the disclosure.

With the development and improvement of 5G networks, more and more mobile phone manufactures have launched 5G mobile phones. In order to save the power of the mobile phones, on a Uu port, the network may configure discontinuous reception (DRX) for the mobile phones. The mobile phone monitors a physical downlink control channel (PDCCH) merely during a wake-up period, and a terminal may not monitor the PDCCH during other periods, so that power consumption is saved. However, during the development and use of 5G mobile phones, it is found that even if DRX is configured, the power consumption of the 5G mobile phones for wireless communication is much larger than the power consumption of 4G mobile phones, and the energy consumption is very high.

Figure 2:
FIG. 2 is a schematic diagram of a method for changing an RRC state according to an example of the disclosure.
Figure 2:
Figure 2:

As shown in FIG. 2, there is provided a method for changing an RRC state, which is performed by a terminal. The method includes the following steps.

Step 21 includes sending the first information to a base station. The first information at least includes the request information configured to request a change from a radio resource control (RRC) connected state to an RRC disconnected state. The RRC disconnected state includes an RRC idle state or an RRC inactive state.

In one example, the terminal may be, but is not limited to, a mobile phone, a wearable device, a vehicle-mounted terminal, a smart home terminal, an industrial sensing device, and/or a medical device that supports 2G, 3G, 4G, and 5G communications.

In one example, the first information may be sent to the base station in response to a requirement for reducing the power consumption of the terminal.

In one example, it is determined that the terminal has the requirement for reducing the power consumption in response to the terminal working in a set scenario.

In one example, it is determined that the terminal has the requirement for reducing the power consumption in response to the terminal working in a work scenario that does not need data interaction with a network side. In some examples, it is determined that the terminal has the requirement for reducing the power consumption in response to the terminal playing an e-book that has been downloaded on the terminal, or a music file that has been downloaded on the terminal, or a video file that has been downloaded on the terminal. In the above-mentioned work scenarios, since the terminal does not need to perform frequent data interaction with the network side, the terminal has the requirement for reducing the power consumption.

In one example, it is determined that the terminal has the requirement for reducing the power consumption in response to the terminal working within a set time period. For example, when the terminal works within a time period from 1 AM to 3 AM, a frequency of wireless communication performed by the terminal during this time period is very low. For the purpose of saving power consumption, it can be determined that the terminal has the requirement for reducing the power consumption during this time period.

In one example, the terminal may receive an operation instruction from a user, and preset a working condition that the terminal has the requirement for reducing the power consumption. It is determined that the terminal has the requirement for reducing the power consumption in response to the terminal satisfying the working condition.

In one example, the terminal may receive the operation instructions from the user, preset a timer for the terminal, and determine that the terminal has the requirement to reduce power consumption in response to the timer running from 1 AM to 3 AM.

In another example, the terminal may receive the operation instruction from the user, and preset a state parameter that the terminal has the requirement for reducing the power consumption. In response to the terminal working based on the state parameter, the terminal has the requirement for reducing the power consumption. For example, the state parameter that the terminal has the requirement for reducing the power consumption is preset as a parameter that a screen of the terminal is in an off state, thus the terminal has the requirement for reducing the power consumption in response to the terminal working based on the parameter that the screen of the terminal is in the off state.

In one example, the terminal periodically detects whether the terminal has the requirement for reducing the power consumption. In one example, historical data of the terminal is sampled and analyzed, and a detection period may be set to be greater than a first time threshold in response to the terminal being in a state of no requirement for reducing the power consumption for a long time period in unit time, and the detection period may be set to be smaller than a second time threshold in response to the terminal being in the state of no requirement for reducing the power consumption for merely a short time period in unit time. The second time threshold is smaller than the first time threshold. In one example, the first time threshold may be set to take different values, and the power consumption of the terminal corresponding to each value within a reference time period may be obtained. According to a corresponding relationship between the different values and the power consumptions, the value corresponding to the minimum power consumption is set as the first time threshold. In one example, the second time threshold may be set to take different values, and the power consumption of the terminal corresponding to each value within the reference time period may be obtained. According to a corresponding relationship between the different values and the power consumptions, the value corresponding to the minimum power consumption is set as the second time threshold. In this way, the terminal may respond to the requirement for reducing the power consumption in time, so that the power consumption of the terminal in unit time is lower.

In one example, the terminal sends the first information when being in the RRC connected state in a 5G network.

In one example, the first information further includes access information of a network accessed by the terminal after the terminal changes to the RRC disconnected state. For example, the access information may be access information for accessing a 4G network after changing to the RRC disconnected state, or access information for accessing a 5G network after changing to the RRC disconnected state. The access information may be information of an access cell recommended by the terminal to the base station based on the detection of cell signals. The access cell recommended to the base station may be a cell whose detected wireless signal strength is greater than a set threshold.

In one example, the terminal may request a change from the RRC connected state in the 5G network to the RRC idle state or the RRC inactive state in the 5G network. The terminal may reside in a cell of the 5G network after changing to the RRC idle state or the RRC inactive state in the 5G network.

In one example, the terminal may request a change from the RRC connected state in the 4G network to the RRC idle state in the 4G network. The terminal may reside in a cell of the 4G network after changing to the RRC idle state in the 4G network.

In the examples of the disclosure, the terminal may actively send the request information to the base station to request a change from the RRC connected state to the RRC disconnected state. Compared with the manner in which the terminal changes from the RRC connected state to the RRC disconnected state only based on the instruction of the base station, the terminal can be in the RRC disconnected state with low power consumption for a longer time, the requirement for reducing the power consumption is satisfied, the power consumption of the terminal is reduced, and standby time of the terminal is prolonged.

In one example, sending the first information to the base station; includes sending an RRC signaling carrying the first information to the base station.

In one example, after sending the RRC signaling carrying the first information to the base station, the terminal periodically sends the RRC signaling carrying the first information to the base station in response to not receiving indication information sent by the base station within a set time range. The indication information at least includes information sent by the base station to the terminal that allows or prohibits the terminal from changing from the RRC connected state to the RRC disconnected state.

In one example, the RRC signaling carrying the first information is a UEAssistanceInformation signaling.

The existing UEAssistanceInformation signaling in the related art is used to carry the first information, thus realizing the reuse of the signaling and improving the compatibility of the solution.

In one example, the UEAssistanceInformation signaling includes a ReleaseRequest information unit, and the ReleaseRequest information unit carries the first information.

In one example, the first information may be represented by more than one bit in the ReleaseRequest information unit. For example, the first information may be represented by 3 bits in the ReleaseRequest information unit, and it means that the ReleaseRequest information unit carries the first information in response to a value of the 3 bits being a set value.

In one example, the first information further includes access information, and the access information enables the terminal to access a wireless network after changing to the RRC disconnected state.

In one example, the access information is the access information of the 5G network accessed by the terminal after changing from the RRC connected state in the 5G network to the RRC idle state or the RRC inactive state.

In another example, the access information is the access information of the 4G network accessed by the terminal after changing from the RRC connected state in the 5G network to the RRC idle state or the RRC inactive state.

In another example, the access information is the access information of the 4G network accessed by the terminal after changing from the RRC connected state in the 4G network to the RRC idle state.

In one example, the access information includes at least one of the following:
  wireless access network information; configured to indicate a type of the wireless network to which the terminal requests to access; or
  access frequency information, configured to indicate a frequency in which the terminal requests to access.

In one example, the type of the wireless network may be, but is not limited to one of the following: a 2G wireless network, a 3G wireless network, a 4G wireless network and a 5G wireless network.

In one example, the access frequency information includes carrier information configured to indicate that the terminal requests to access a cell. The carrier information includes a carrier identification and/or a carrier frequency. Frequencies of different carriers are different. The terminal may detect signals of different cells, determine a cell whose signal strength is greater than a set threshold as a recommended cell, and determine an access frequency of the recommended cell as the frequency that the terminal requests to access.

Figure 3:
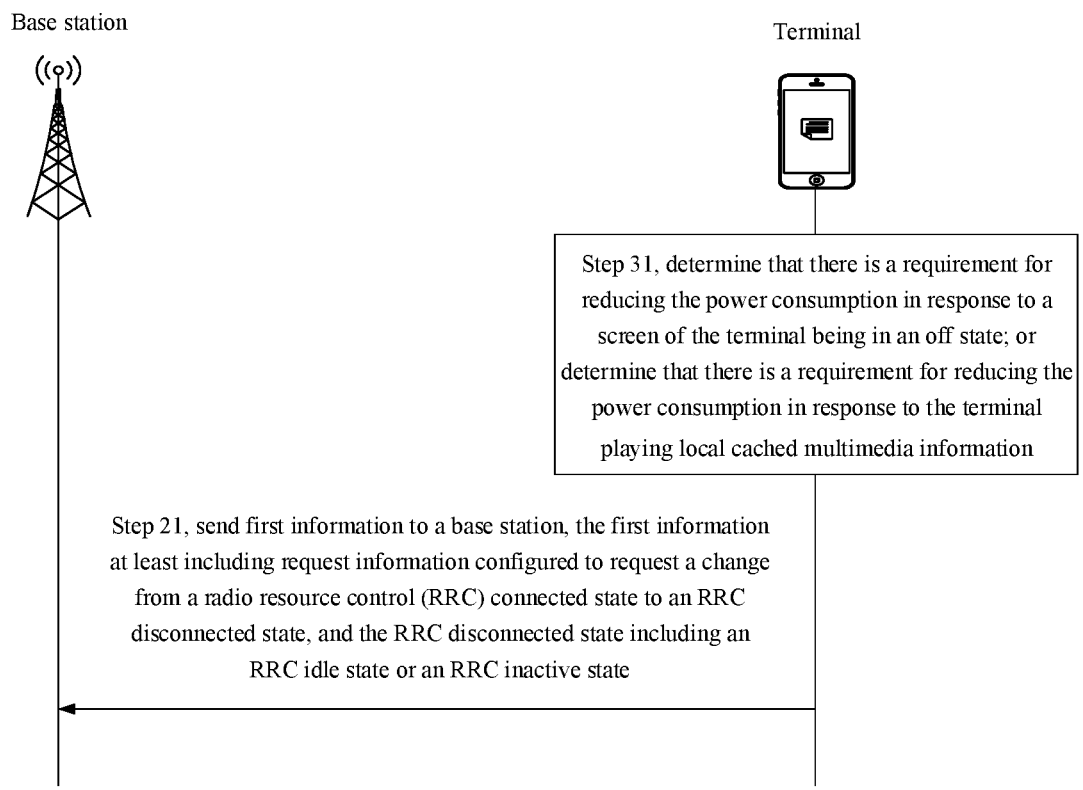
FIG. 3 is a schematic diagram of a method for changing an RRC state according to another example of the disclosure.

As shown in FIG. 3, there is further provided a method for changing an RRC state according to another example of the disclosure, and the method further includes:

Step 31 includes determining that there is the requirement for reducing the power consumption in response to a screen of the terminal being in an off state; or,
  determining that there is the requirement for reducing the power consumption in response to the terminal playing local cached multimedia information.

In one example, it is determined that the terminal has the requirement for reducing the power consumption in response to the time that the screen of the terminal is in the off state being greater than a set time threshold.

The time that the screen of the terminal is in the off state being greater than the set time threshold, being greater than the set time threshold, means that the terminal might work in a sleep mode with less interaction with the network side, thus it is determined that the terminal has the requirement for reducing the power consumption. For example, the terminal is an intelligent bracelet, and in response to the screen of the intelligent bracelet being in the off state for a long time, it may be determined that the intelligent bracelet is always in the sleep mode due to not being used by a user, in this case, the intelligent bracelet in the sleep mode has less interaction with the network side, so it has the requirement for reducing the power consumption.

In one example, cached multimedia information may be, but is not limited to, video information, audio information, and/or picture information.

Since the multimedia information has been cached in the terminal, it is not necessary for the terminal to obtain the multimedia information from the network side in real time based on the wireless communication with the network side. In this case, it can be determined that the terminal has the requirement for reducing the power consumption.

In one example, it is determined that the terminal has the requirement for reducing the power consumption in response to the time that the terminal plays the local cached multimedia information being greater than a set time threshold.

In one example, determining that there is the requirement for reducing the power consumption in response to the screen of the terminal being in the off state, includes: determining that there is the requirement for reducing the power consumption in response to the screen of the terminal being in the off state within a preset time period, where a usage frequency of the terminal within the preset time period is lower than a usage frequency of the terminal outside the preset time period.

In one example, the preset time period is from 1 AM to 5 AM. During this time period, the screen of the terminal is in the off state, and there is almost no data interaction between the terminal and the network, thus, it can be determined that the terminal has the requirement for reducing the power consumption.

In one example, the usage frequency may be a frequency of the screen being on and off.

Figure 4:
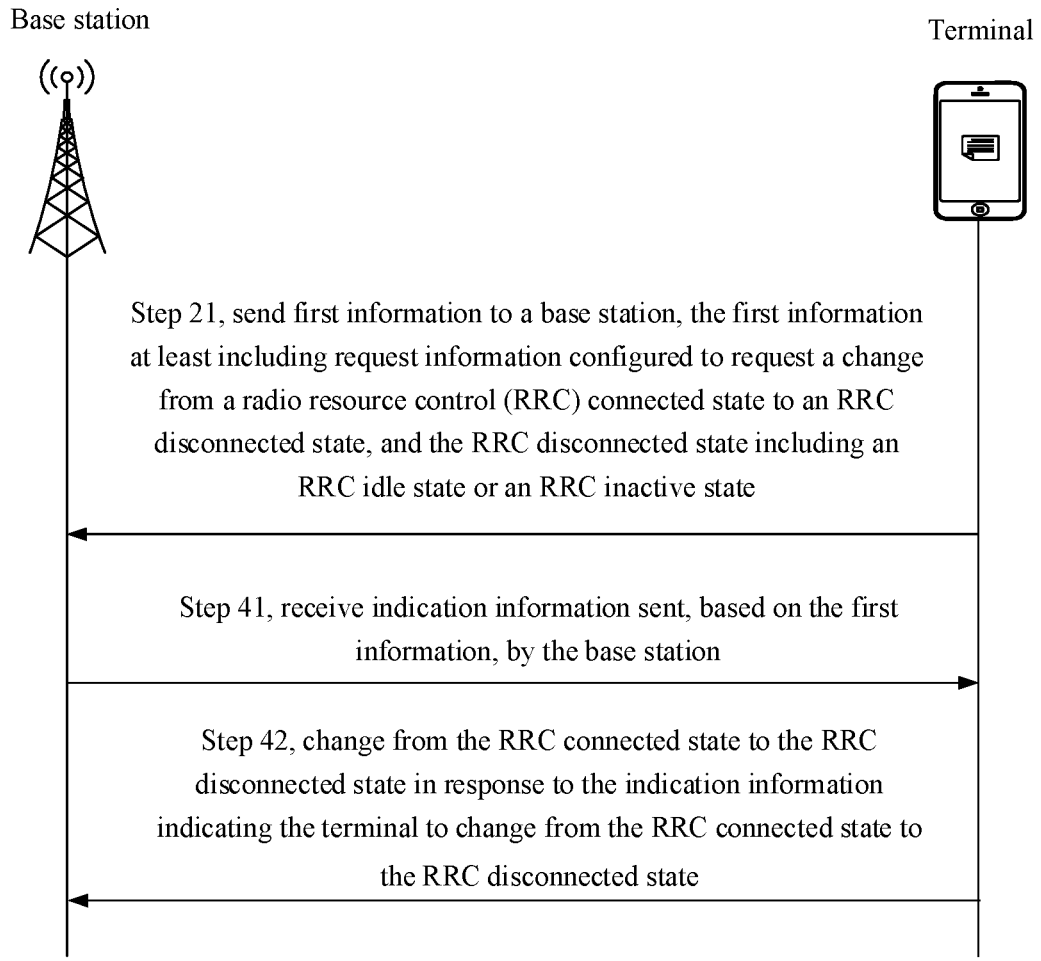
FIG. 4 is a schematic diagram of a method for changing an RRC state according to further another example of the disclosure.

As shown in FIG. 4, there is further provided a method for changing an RRC state according to another example of the disclosure, and the method further includes the following steps.

Step 41, receiving the indication information sent, based on the first information, by the base station.

In one example, the indication information may indicate that the terminal is permitted to change from the RRC connected state in the 5G network to the RRC idle state or the RRC inactive state in the 5G network.

In another example, the indication information may indicate that the terminal is permitted to change from the RRC connected state in the 4G network to the RRC idle state in the 4G network.

In one example, receiving the indication information sent, based on the first information, by the base station, includes: receiving an RRC signaling carrying the indication information sent, based on the first information, by the base station.

In one example, an RRC Release signaling includes a RedirectedCarrierInfo unit, and the RedirectedCarrierInfo unit carries the indication information.

Step 42, changing from the RRC connected state to the RRC disconnected state in response to the indication information indicating the terminal to change from the RRC connected state to the RRC disconnected state.

In one example, in response to the indication information indicating that the terminal is permitted to change from the RRC connected state in the 5G network to the RRC idle state or the RRC inactive state in the 5G network, the terminal changes from the RRC connected state in the 5G network to the RRC idle state or the RRC inactive state in the 5G network.

In one example, the terminal may reside in a cell of the 5G network or the 4G network after changing from the RRC connected state in the 5G network to the RRC idle state in the 5G network.

In another example, in response to the indication information indicating that the terminal is permitted to change from the RRC connected state in the 4G network to the RRC idle state in the 4G network, the terminal changes from the RRC connected state in the 4G network to the RRC idle state in the 4G network.

In one example, the terminal resides in a cell of the 4G network after changing from the RRC connected state in the 4G network to the RRC idle state in the 4G network.

Figure 5:
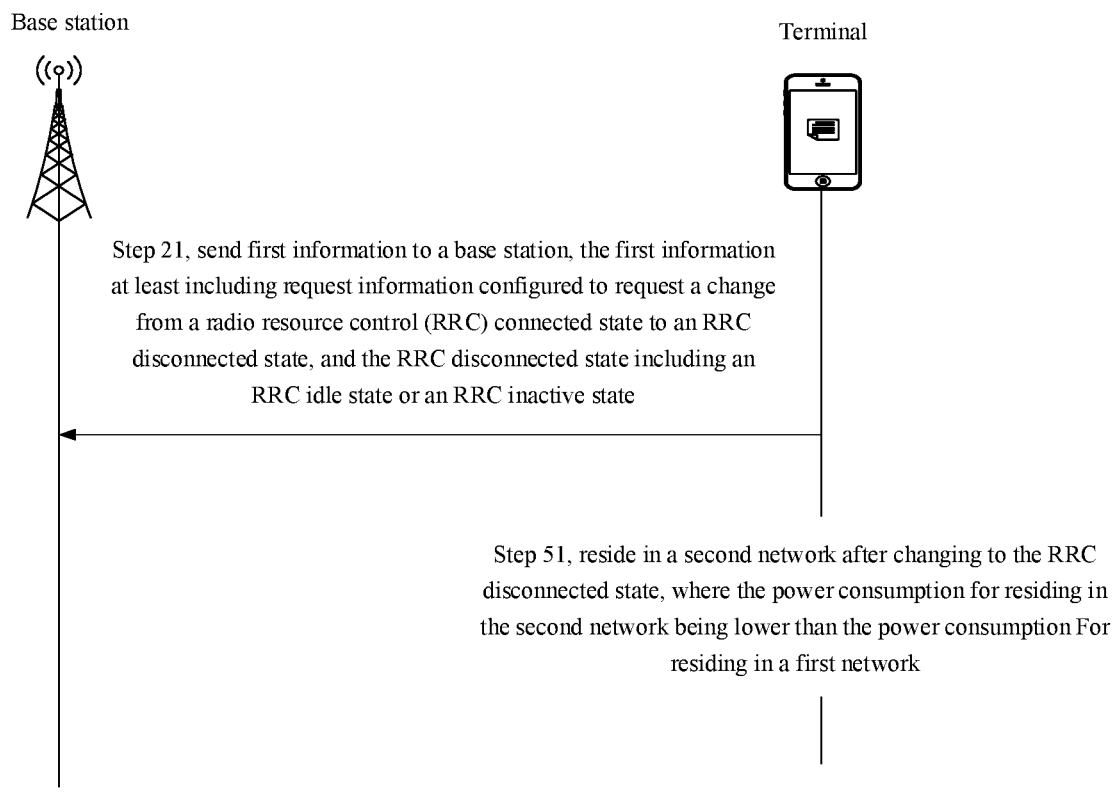
FIG. 5 is a schematic diagram of a method for changing an RRC state according to yet another example of the disclosure.

As shown in FIG. 5, there is further provided a method for changing an RRC state according to another example of the disclosure, and the terminal can be connected to a first network and a second network in the RRC connected state.

The method further includes:

Step 51 includes residing in the second network after changing to the RRC disconnected state, where the power consumption for residing in the second network being lower than the power consumption for residing in the first network.

In one example, the first network is the 5G network, and the second network is the 4G network. Since the power consumption of the terminal residing in the 4G network is lower than the power consumption residing in the 5G network, it is beneficial to further reduce the power consumption of the terminal by residing in the 4G network after the terminal changes to the RRC inactive state.

Figure 6:
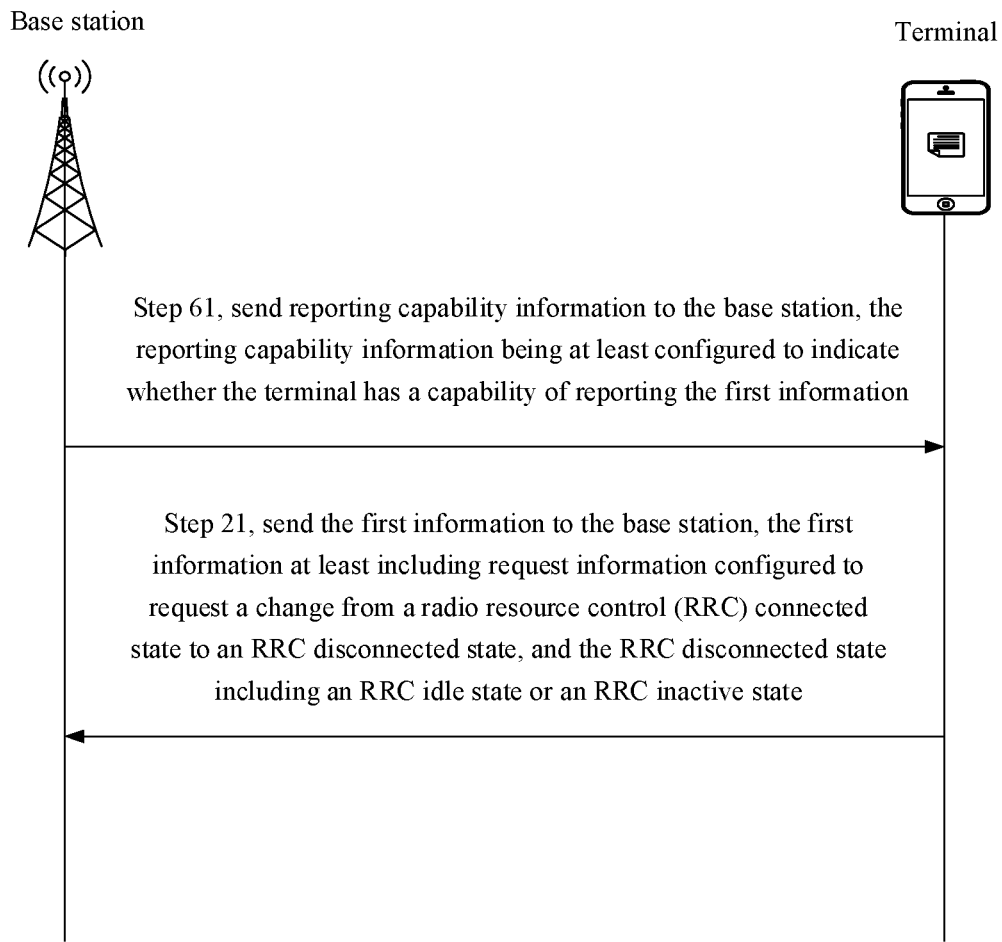
FIG. 6 is a schematic diagram of a method for changing an RRC state according to yet another example of the disclosure.

As shown in FIG. 6, there is further provided a method for changing an RRC state according to another example of the disclosure. Before sending the first information to the base station, the method further includes:

Step 61 sends reporting capability information to the base station, the reporting capability information being at least configured to indicate whether the terminal has a capability of reporting the first information.

In one example, a communication standard specifies whether the terminal has the capability of reporting the first information. The terminal determines whether it has the capability of reporting the first information according to the type of the communication standard adopted by the wireless communication.

In another example, the terminal may determine whether it has the capability of reporting the first information according to configuration information sent by the base station.

In one example, sending the reporting capability information to the base station, includes: sending an RRC signaling carrying the reporting capability information to the base station.

In one example, the RRC signaling carrying the reporting capability information is a UE-NR-Capability signaling.

Figure 7:
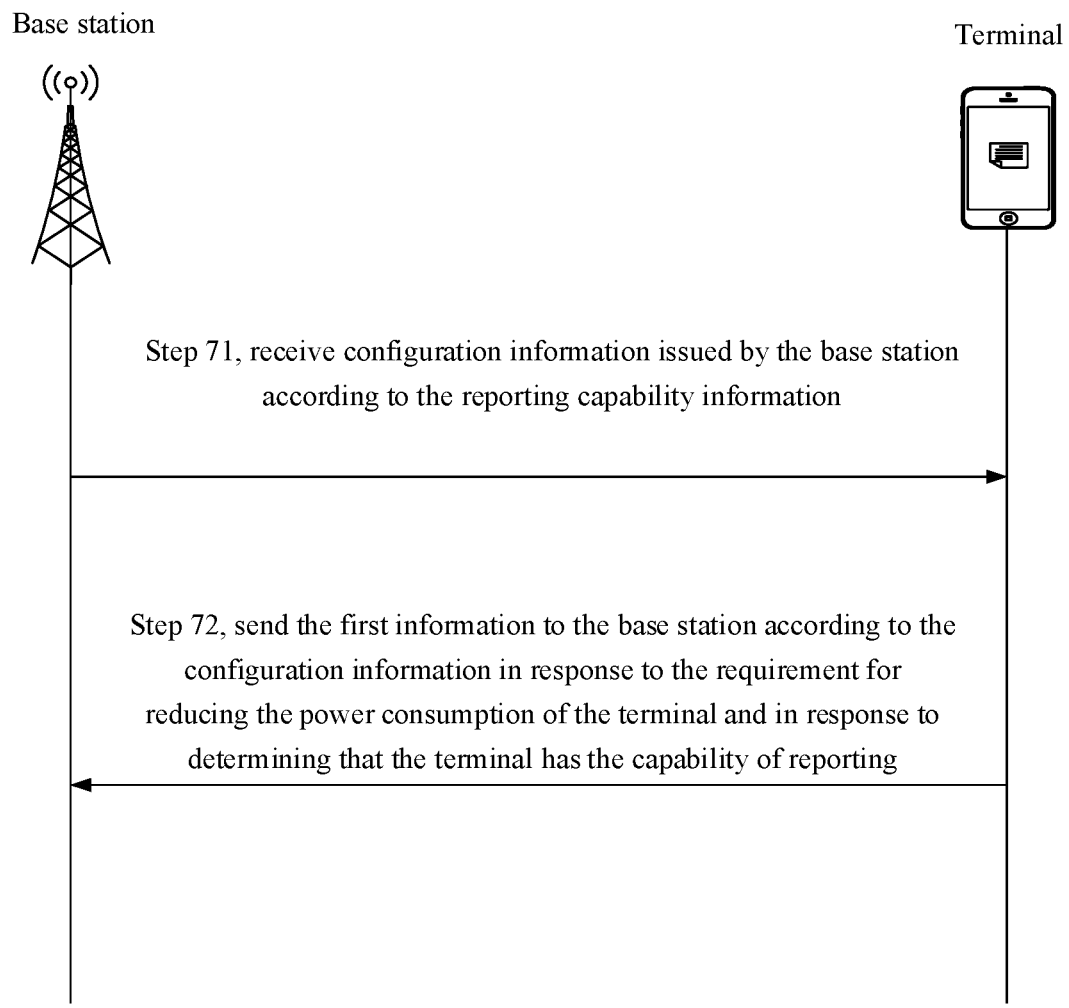
FIG. 7 is a schematic diagram of a method for changing an RRC state according to yet another example of the disclosure.

As shown in FIG. 7, there is further provided a method for changing an RRC state according to another example of the disclosure, and the method further includes the following steps.

Step 71 includes receiving configuration information sent by the base station according to the reporting capability information.

Sending the first information to the base station, includes:

Step 72, sending the first information to the base station according to the configuration information in response to determining that the terminal has the capability of reporting.

In one example, the configuration information includes at least one of the following.

reporting permission information, configured to indicate whether the terminal is permitted to report the first information.

In one example, in response to the reporting permission information indicating that the terminal is permitted to report the first information, the terminal may send the first information to the base station; and in response to the reporting permission information indicating that the terminal is inhibited from reporting the first information, the terminal cannot send the first information to the base station.

Blocking timer information, configured to indicate a timing duration of a blocking timer, the timing duration is a time interval between two adjacent reporting of the first information.

In one example, the timing duration may be set to be greater than a set time threshold, in this way, the frequency of the terminal to send the first information to the base station can be reduced.

Preset working mode information, configured to indicate a working scenario in which the terminal has the requirement for reducing the power consumption.

In one example, the preset working mode information indicates that the terminal has the requirement for reducing the power consumption in the case that the terminal works in a work scenario that does not need data interaction with the network side. In some examples, the preset working mode information indicates that the terminal has the requirement for reducing the power consumption in the case that the user reads an e-book that has been downloaded on the terminal, or listens to a music file that has been downloaded on the terminal, or views a video file that has been downloaded on the terminal.

In one example, the preset working mode information indicates that the terminal has the requirement for reducing the power consumption when working within a set time period. For example, the preset working mode information indicates that the terminal has the requirement for reducing the power consumption in the case that the terminal works within a time period from 1 AM to 3 AM, because a frequency of wireless communication performed by the terminal during this time period is very low, and for the purpose of saving power consumption, it can be determined that the terminal has the requirement for reducing the power consumption during this time period.

Reporting content information, configured to indicate reporting content of the first information.

In one example, the reporting content of the first information may include information of corresponding working scenario in which the terminal has the requirement for reducing the power consumption.

Reporting format information, configured to indicate reporting format of the first information.

In one example, receiving the configuration information sent by the base station according to the reporting capability information includes: receiving an RRC signaling carrying the configuration information sent by the base station according to the reporting capability information.

In one example, the RRC signaling carrying the configuration information is an RRCReconfiguration signaling.

In one example, the configuration information may be configured in an OtherConfig unit in the RRCReconfiguration signaling.

Figure 8:
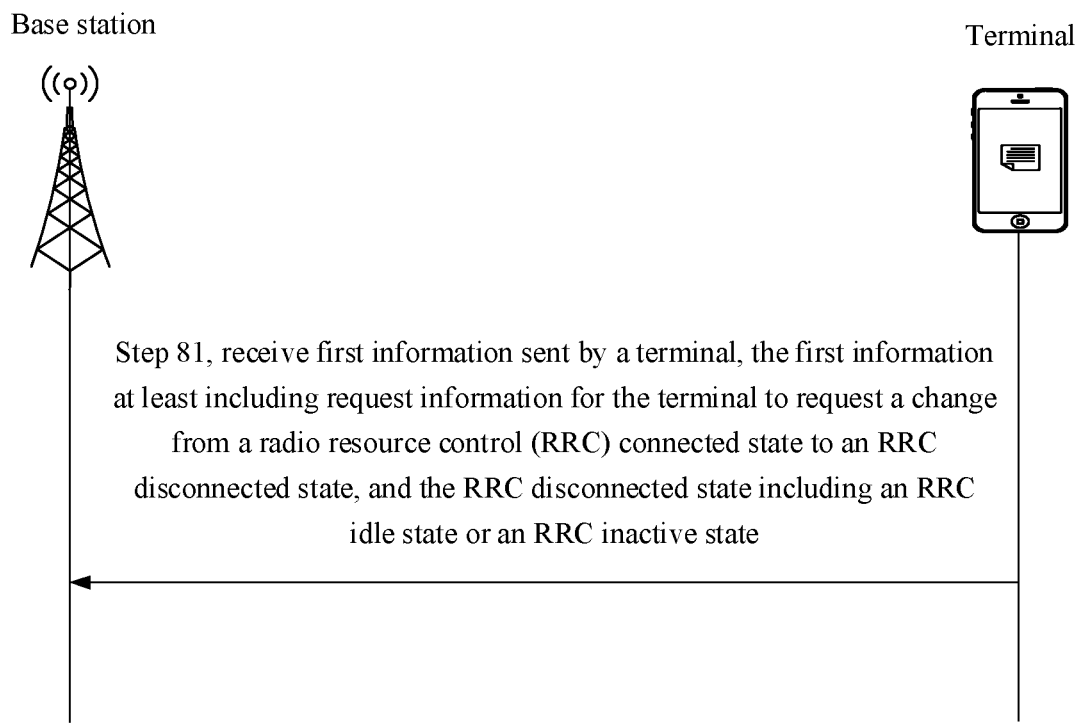
FIG. 8 is a schematic diagram of a method for changing an RRC state according to yet another example of the disclosure.

As shown in FIG. 8, there is further provided a method for changing an RRC state according to another example of the disclosure. The method is performed by a base station and includes:

Step 81 receives first information sent by a terminal, the first information at least including request information for the terminal to request a change from a radio resource control (RRC) connected state to an RRC disconnected state, and the RRC disconnected state including an RRC idle state or an RRC inactive state In one example, the terminal may be, but is not limited to a mobile phone, a wearable device, a vehicle-mounted terminal, a smart home terminal, an industrial sensing device and/or a medical device that supports 2G, 3G, 4G, and 5G communications.

In one example, the first information sent by the terminal in response to a requirement for reducing the power consumption of the terminal may be received.

In one example, it is determined that the terminal has the requirement for reducing the power consumption in response to the terminal working in a set scenario.

In one example, it is determined that the terminal has the requirement for reducing the power consumption in response to the terminal working in a work scenario that does not need data interaction with a network side. In some examples, it is determined that the terminal has the requirement for reducing the power consumption in response to the terminal playing an e-book that has been downloaded on the terminal, or a music file that has been downloaded on the terminal, or a video file that has been downloaded on the terminal. Since the terminal does not need to perform frequent data interaction with the network side in the above scenarios, the terminal has the requirement for reducing the power consumption.

In one example, it is determined that the terminal has the requirement for reducing the power consumption in response to the terminal working within a set time period. For example, when the terminal works within a time period from 1 AM to 3 AM, a frequency of wireless communication performed by the terminal during this time period is very low. For the purpose of saving power consumption, it can be determined that the terminal has the requirement for reducing the power consumption during this time period.

In one example, the terminal may receive an operation instruction from a user, and preset a working condition that the terminal has the requirement for reducing the power consumption. It is determined that the terminal has the requirement for reducing the power consumption in response to the terminal satisfying the working condition.

In one example, the terminal may receive the operation instructions from the user, preset a timer for the terminal, and determine that the terminal has the requirement to reduce power consumption in response to the timer running from 1 AM to 3 AM.

In another example, the terminal may receive the operation instruction from the user, and preset a state parameter that the terminal has the requirement for reducing the power consumption. In response to the terminal working based on the state parameter, the terminal has the requirement for reducing the power consumption. For example, the state parameter that the terminal has the requirement for reducing the power consumption is preset as a parameter that a screen of the terminal is in an off state, thus the terminal has the requirement for reducing the power consumption in response to the terminal working based on the parameter that the screen of the terminal is in the off state.

In one example, the terminal periodically detects whether the terminal has the requirement for reducing the power consumption. In one example, historical data of the terminal is sampled and analyzed, and a detection period may be set to be greater than a first time threshold in response to the terminal being in a state of no requirement for reducing the power consumption for a long time period in unit time, and the detection period may be set to be smaller than a second time threshold in response to the terminal being in the state of no requirement for reducing the power consumption for merely a short time period in unit time. The second time threshold is smaller than the first time threshold. In one example, the first time threshold may be set to take different values, and the power consumption of the terminal corresponding to each value within a reference time period may be obtained. According to a corresponding relationship between the different values and the power consumptions, the value corresponding to the minimum power consumption is set as the first time threshold. In one example, the second time threshold may be set to take different values, and the power consumption of the terminal corresponding to each value within the reference time period may be obtained. According to a corresponding relationship between the different values and the power consumptions, the value corresponding to the minimum power consumption is set as the second time threshold. In this way, the terminal may respond to the requirement for reducing the power consumption in time, so that the power consumption of the terminal in unit time is lower.

In one example, the terminal sends the first information when being in the RRC connected state in a 5G network.

In one example, the first information further includes access information of a network accessed by the terminal after the terminal changes to the RRC disconnected state. For example, the access information may be access information for accessing a 4G network after changing to the RRC disconnected state, or access information for accessing a 5G network after changing to the RRC disconnected state. The access information may be information of an access cell recommended by the terminal to the base station based on the detection of cell signals. The access cell recommended to the base station may be a cell whose detected wireless signal strength is greater than a set threshold.

In one example, the terminal may request a change from the RRC connected state in the 5G network to the RRC idle state or the RRC inactive state in the 5G network. The terminal may reside in a cell of the 5G network after changing to the RRC idle state or the RRC inactive state in the 5G network.

In one example, the terminal may request a change from the RRC connected state in the 4G network to the RRC idle state in the 4G network. The terminal may reside in a cell of the 4G network after changing to the RRC idle state in the 4G network.

In one example, receiving the first information sent by the terminal in response to the requirement for reducing the power consumption of the terminal; includes: receiving an RRC signaling carrying the first information sent by the terminal in response to the requirement for reducing the power consumption of the terminal.

In one example, the RRC signaling carrying the first information is a UEAssistanceInformation signaling.

The existing UEAssistanceInformation signaling in the related art is used to carry the first information, thus realizing the reuse of the signaling and improving the compatibility of the solution. In one example, the UEAssistanceInformation signaling includes a ReleaseRequest information unit, and the ReleaseRequest information unit carries the first information.

In one example, the first information may be represented by more than one bit in the ReleaseRequest information unit. For example, the first information may be represented by 3 bits in the ReleaseRequest information unit, and it means that the ReleaseRequest information unit carries the first information in response to a value of the 3 bits being a set value.

In one example, the request information includes access information, and the access information enables the terminal to access a wireless network after changing to the RRC disconnected state.

In one example, the access information is the access information of the 5G network accessed by the terminal after changing from the RRC connected state in the 5G network to the RRC idle state or the RRC inactive state.

In another example, the access information is the access information of the 4G network accessed by the terminal after changing from the RRC connected state in the 5G network to the RRC idle state or the RRC inactive state.

In another example, the access information is the access information of the 4G network accessed by the terminal after changing from the RRC connected state in the 4G network to the RRC idle state.

In one example, the access information includes at least one of the following:
  wireless access network information; configured to indicate a type of the wireless network to which the terminal requests to access; or
  access frequency information; configured to indicate a frequency in which the terminal requests to access.

In one example, the type of the wireless network may be, but is not limited to, one of the following: a 2G wireless network, a 3G wireless network, a 4G wireless network, and a 5G wireless network.

In one example, the access frequency information includes carrier information configured to indicate that the terminal requests to access a cell. The carrier information includes a carrier identification and/or a carrier frequency. Frequencies of different carriers are different. The terminal may detect signals of different cells, determine a cell whose signal strength is greater than a set threshold as a recommended cell, and determine an access frequency of the recommended cell as the frequency that the terminal requests to access.

Figure 9:
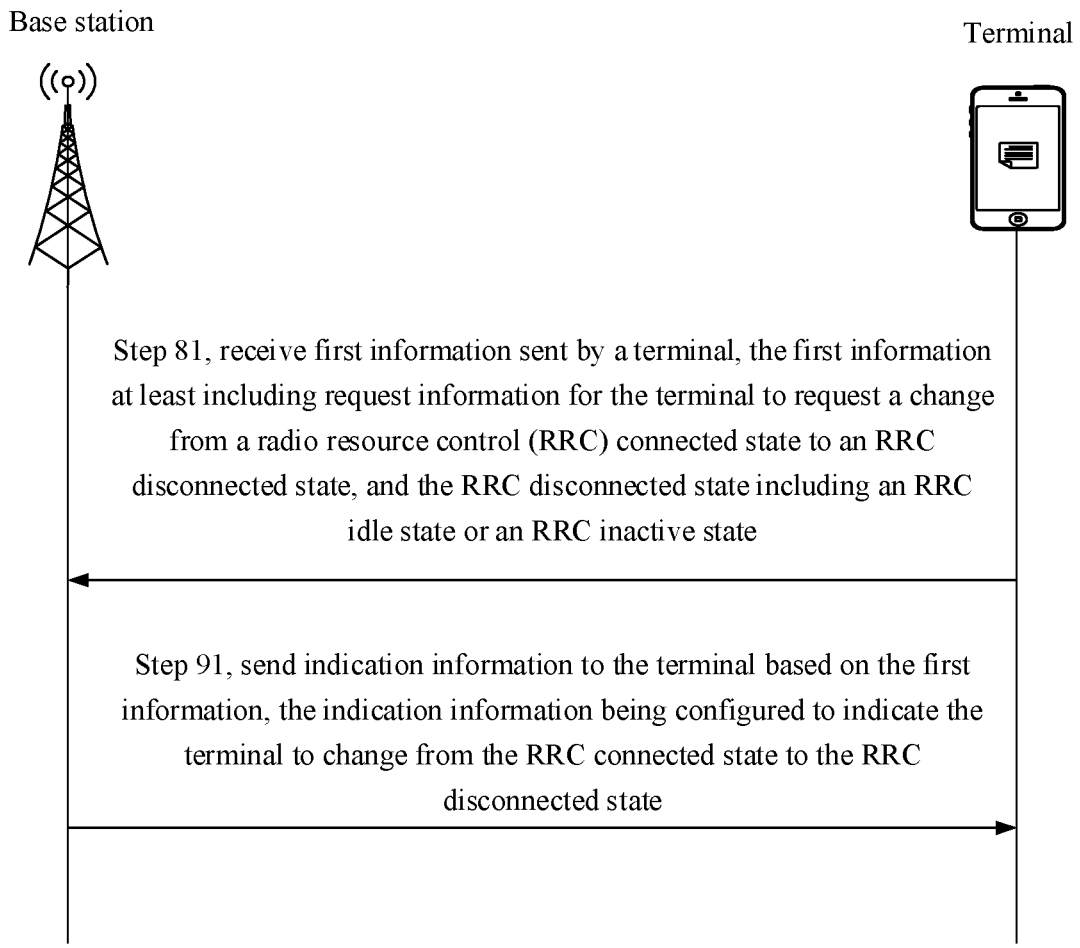
FIG. 9 is a schematic diagram of a method for changing an RRC state according to yet another example of the disclosure.

As shown in FIG. 9, there is further provided a method for changing an RRC state according to another example of the disclosure. The method further includes:

Step 91 sends indication information to the terminal based on the first information, the indication information being configured to indicate the terminal to change from the RRC connected state to the RRC disconnected state.

In one example, the indication information may indicate that the terminal is permitted to change from the RRC connected state in the 5G network to the RRC idle state or the RRC inactive state in the 5G network.

In another example, the indication information may indicate that the terminal is permitted to change from the RRC connected state in the 4G network to the RRC idle state in the 4G network.

In one example, sending the indication information to the terminal based on the first information; includes: sending an RRC signaling carrying the indication information to the terminal based on the first information.

In one example, the RRC signaling carrying the indication information is an RRC Release signaling.

In one example, the RRC Release signaling includes a RedirectedCarrierInfo unit, and the RedirectedCarrierInfo unit carries the indication information.

In one example, before receiving the first information sent by the terminal in response to the requirement for reducing the power consumption of the terminal, the method further includes: receiving reporting capability information sent by the terminal, the reporting capability information being at least configured to indicate whether the terminal has a capability of reporting the first information.

In one example, a communication standard specifies whether the terminal has the capability of reporting the first information. The terminal determines whether it has the capability of reporting the first information according to the type of the communication standard adopted by wireless communication.

In another example the terminal may determine whether it has the capability of reporting the first information according to configuration information sent by the base station.

In one example, receiving the reporting capability information sent by the terminal, includes: receiving an RRC signaling carrying the reporting capability information sent by the terminal.

In one example, the RRC signaling carrying the capability information is a UE-NR-Capability signaling.

Figure 10:
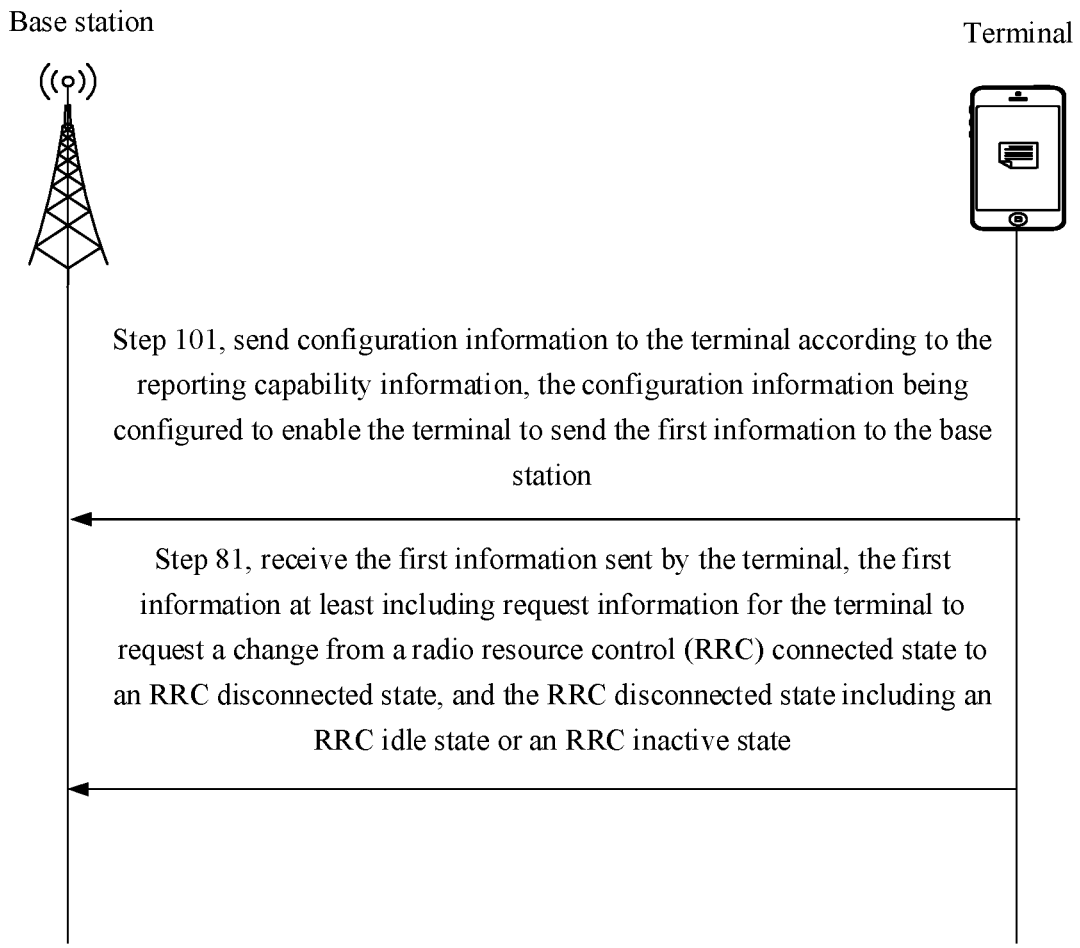
FIG. 10 is a schematic diagram of a method for changing an RRC state according to an example of the disclosure.

As shown in FIG. 10, there is further provided a method for changing an RRC state according to another example of the disclosure. The method further includes:

step 101, sending configuration information to the terminal according to the reporting capability information, the configuration information being configured to enable the terminal to send the first information to the base station.

In one example, the configuration information includes at least one of the following.

reporting permission information, configured to indicate whether the terminal is permitted to report the first information.

In one example, in response to the reporting permission information indicating that the terminal is permitted to report the first information, the terminal may send the first information to the base station; and in response to the reporting permission information indicating that the terminal is inhibited from reporting the first information, the terminal cannot send the first information to the base station.

Blocking timer information, configured to indicate a timing duration of a blocking timer, the timing duration is a time interval between two adjacent reporting of the first information.

In one example, the timing duration may be set to be greater than a set time threshold, in this way, the frequency of the terminal to send the first information to the base station can be reduced.

Preset working mode information, configured to indicate a working scenario in which the terminal has the requirement for reducing the power consumption.

In one example, the preset working mode information indicates that the terminal has the requirement for reducing the power consumption in the case that the terminal works in a work scenario that does not need data interaction with the network side. In some examples, the preset working mode information indicates that the terminal has the requirement for reducing the power consumption in the case that the user reads an e-book that has been downloaded on the terminal, or listens to a music file that has been downloaded on the terminal, or views a video file that has been downloaded on the terminal.

In one example, the preset working mode information indicates that the terminal has the requirement for reducing the power consumption when working within a set time period. For example, the preset working mode information indicates that the terminal has the requirement for reducing the power consumption in the case that the terminal works within a time period from 1 AM to 3 AM, because a frequency of wireless communication performed by the terminal during this time period is very low, and for the purpose of saving power consumption, it can be determined that the terminal has the requirement for reducing the power consumption during this time period.

Reporting content information, configured to indicate reporting content of the first information.

In one example, the reporting content of the first information may include information of corresponding working scenario in which the terminal has the requirement for reducing the power consumption.

Reporting format information, configured to indicate reporting format of the first information.

In one example, sending the configuration information to the terminal according to the reporting capability information, includes: sending an RRC signaling carrying the configuration information to the terminal according to the reporting capability information.

In one example, the RRC signaling carrying the configuration information is an RRCReconfiguration signaling.

Figure 11:
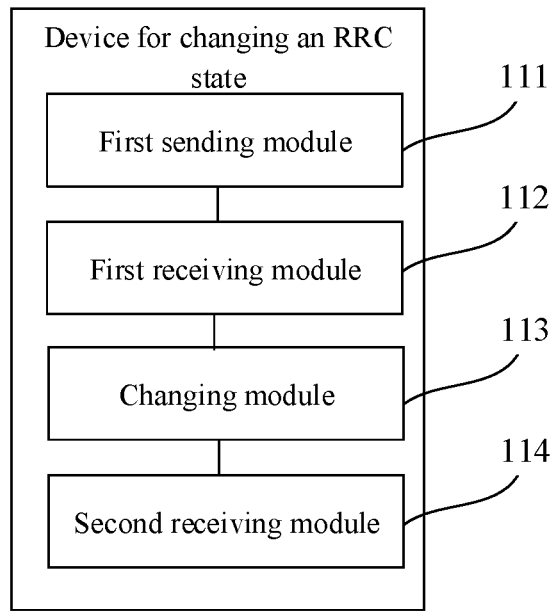
FIG. 11 is a schematic diagram of a device for changing an RRC state according to an example of the disclosure.

As shown in FIG. 11, there is provided a device for changing an RRC state according to an example of the disclosure. The device is applied to a terminal and includes a first sending module 111.

The first sending module 111 is configured to send first information to a base station, and the first information at least includes request information configured to request a change from a radio resource control (RRC) connected state to an RRC disconnected state, and the RRC disconnected state includes an RRC idle state or an RRC inactive state.

In one example, the first sending module 111 is further configured to send the first information to the base station in response to a requirement for reducing the power consumption of the terminal.

In one example, the first sending module 111 is further configured to send an RRC signaling carrying the first information to the base station.

In one example, the RRC signaling carrying the first information is a UEAssistanceInformation signaling.

In one example, the UEAssistanceInformation signaling includes a ReleaseRequest information unit, and the ReleaseRequest information unit carries the first information.

In one example, the first information further includes access information, and the access information enables the terminal to access a wireless network after changing to the RRC disconnected state.

In one example, the access information includes at least one of the following:

wireless access network information configured to indicate a type of the wireless network to which the terminal requests to access; or access frequency information, configured to indicate a frequency in which the terminal requests to access.

In one example, the first sending module 111 is further configured to further include at least one of the following:

determining that there is a requirement for reducing the power consumption in response to a screen of the terminal being in an off state; or determining that there is a requirement for reducing the power consumption in response to the terminal playing local cached multimedia information.

In one example, the first sending module 111 is further configured to determine that there is the requirement for reducing the power consumption in response to the screen of the terminal being in the off state within a preset time period, where usage frequency of the terminal within the preset time period is lower than the usage frequency of the terminal outside the preset time period.

In one example, the device further includes a first receiving module 112 and a changing module 113.

The first receiving module 112 is configured to receive indication information sent by the base station based on the first information.

The changing module 113 is configured to change from the RRC connected state to the RRC disconnected state in response to the indication information indicating to change.

In one example, the terminal can be connected to a first network and a second network in the RRC connected state.

The changing module 113 is further configured to reside in the second network after changing to the RRC disconnected state, where the power consumption for residing in the second network being lower than the power consumption for residing in the first network.

In one example, the first receiving module 112 is further configured to receive an RRC signaling carrying the indication information sent by the base station based on the first information.

In one example, the RRC signaling carrying the indication information is an RRC Release signaling.

In one example, the RRC Release signaling includes a RedirectedCarrierInfo unit, and the RedirectedCarrierInfo unit carries the indication information.

In one example, the first sending module 111 is further configured to send a reporting capability information to the base station, the reporting capability information being at least configured to indicate whether the terminal has a capability of reporting the first information.

In one example, the first sending module 111 is further configured to send an RRC signaling carrying the reporting capability information to the base station.

In one example, the RRC signaling carrying the reporting capability information is a UE-NR-Capability signaling.

In one example, the device further includes a second receiving module 114.

The second receiving module 114 is further configured to receive configuration information sent by the base station according to the reporting capability information.

The first sending module 111 is further configured to send the first information to the base station according to the configuration information in response to determining that the terminal has the capability of reporting.

In one example, the configuration information includes at least one of the following:
- reporting permission information; configured to indicate whether the terminal is permitted to report the first information;
- blocking timer information; configured to indicate a timing duration of a blocking timer, the timing duration is a time interval between two adjacent reporting of the first information;
- preset working mode information, configured to indicate a working scenario in which the terminal has the requirement for reducing the power consumption;
- reporting content information; configured to indicate reporting content of the first information; or
- reporting format information; configured to indicate the reporting format of the first information.

In one example, the second receiving module 114 is further configured to receive an RRC signaling carrying the configuration information sent by the base station according to the reporting capability information.

In one example, the RRC signaling carrying the configuration information is an RRCReconfiguration signaling.

Figure 12:
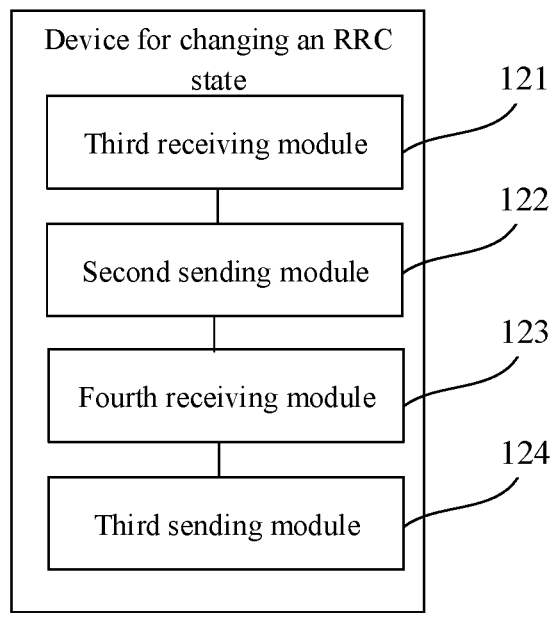
FIG. 12 is a schematic diagram of a device for changing an RRC state according to another example of the disclosure.

As shown in FIG. 12, there is provided a device for changing an RRC state according to another example of the disclosure. The device is applied to a base station and includes a third receiving module 121.

The third receiving module 121 is configured to receive first information sent by a terminal, and first information at least includes request information for the terminal to request a change from a radio resource control (RRC) connected state to an RRC disconnected state; and the RRC disconnected state includes an RRC idle state or an RRC inactive state.

In one example, the third receiving module 121 is further configured to receive the first information sent by the terminal in response to a requirement for reducing the power consumption of the terminal.

In one example, the third receiving module 121 is further configured to receive an RRC signaling carrying the first information sent by the terminal.

In one example, the RRC signaling carrying the first information is a UEAssistanceInformation signaling.

In one example, the UEAssistanceInformation signaling includes a ReleaseRequest information unit, and the ReleaseRequest information unit carries the first information.

In one example, the request information includes access information, and the access information is configured to enable the terminal to access a wireless network after changing to the RRC disconnected state.

In one example, the access information includes at least one of the following:
- wireless access network information configured to indicate a type of the wireless network to which the terminal requests to access; or
- access cell frequency information configured to indicate a frequency in which the terminal requests to access.

In one example, the device further includes a second sending module 122.

The second sending module is further configured to send indication information to the terminal based on the first information, and the indication information is configured to indicate to the terminal to change from the RRC connected state to the RRC disconnected state.

In one example, the second sending module 122 is further configured to send an RRC signaling carrying the indication information to the terminal based on the first information.

In one example, the RRC signaling carrying the indication information is an RRC Release signaling.

In one example, the RRC Release signaling includes a RedirectedCarrierInfo unit, and the RedirectedCarrierInfo unit carries the indication information.

In one example, the device further includes a fourth receiving module 123.

The fourth receiving module 123 is configured to receive reporting capability information sent by the terminal, and the reporting capability information is at least configured to indicate whether the terminal has a capability of reporting the first information.

In one example, the fourth receiving module 123 is further configured to receive an RRC signaling carrying the reporting capability information sent by the terminal.

In one example, the RRC signaling carrying the capability information is a UE-NR-Capability signaling.

In one example, the device further includes a third sending module 124.

The third sending module is further configured to send configuration information to the terminal according to the reporting capability information, and the configuration information is configured to enable the terminal to send the first information to the base station.

In one example, the configuration information includes at least one of the following:
- reporting permission information; configured to indicate whether the terminal is permitted to report the first information;
- blocking timer information; configured to indicate a timing duration of a blocking timer, the timing duration is a time interval between two adjacent reporting of the first information;
- preset working mode information; configured to indicate a working scenario in which the terminal has the requirement for reducing the power consumption;

reporting content information, configured to indicate reporting content of the first information; or reporting format information; configured to indicate the reporting format of the first information.

In one example, the third sending module 124 is further configured to send an RRC signaling carrying the configuration information to the terminal according to the reporting capability information.

In one example, the RRC signaling carrying the configuration information is an RRCReconfiguration signaling.

There is further provided a communication apparatus according to an example of the disclosure, including:

an antenna;

a memory; and a processor, connected to the antenna and the memory, respectively. The processor is configured to control the antenna to transceive a wireless signal by executing an executable program stored in the memory, and can execute the steps of the wireless network access method provided by any of the above examples.

The communication apparatus, according to the example, may be the above-mentioned terminal or base station. The terminal may be various human-mounted terminals or vehicle-mounted terminals. The base station may be various types of base stations, such as a 4G base station or a 5G base station.

The antenna may be various types of antennas, such as a 3G antenna, a 4G antenna, or a 5G antenna, and other mobile antennas. The antenna may further include a WiFi antenna or a wireless charging antenna.

The memory may include various types of storage media. The storage media may be non-transitory computer storage media, and can continue to memorize information stored thereon after the communication apparatus is powered down.

The processor may be connected to the antenna and the memory via a bus and the like, and configured to read executable programs stored on the memory, such as at least one of the methods shown in any example of the disclosure.

There is further provided a non-transitory computer-readable storage medium according to an example of the disclosure. The non-transitory computer-readable storage medium stores executable programs, the executable programs implement the steps of the wireless network access method provided by any of the above examples, for example, at least one of the methods shown in any example of the disclosure, when being executed by a processor.

Figure 13:
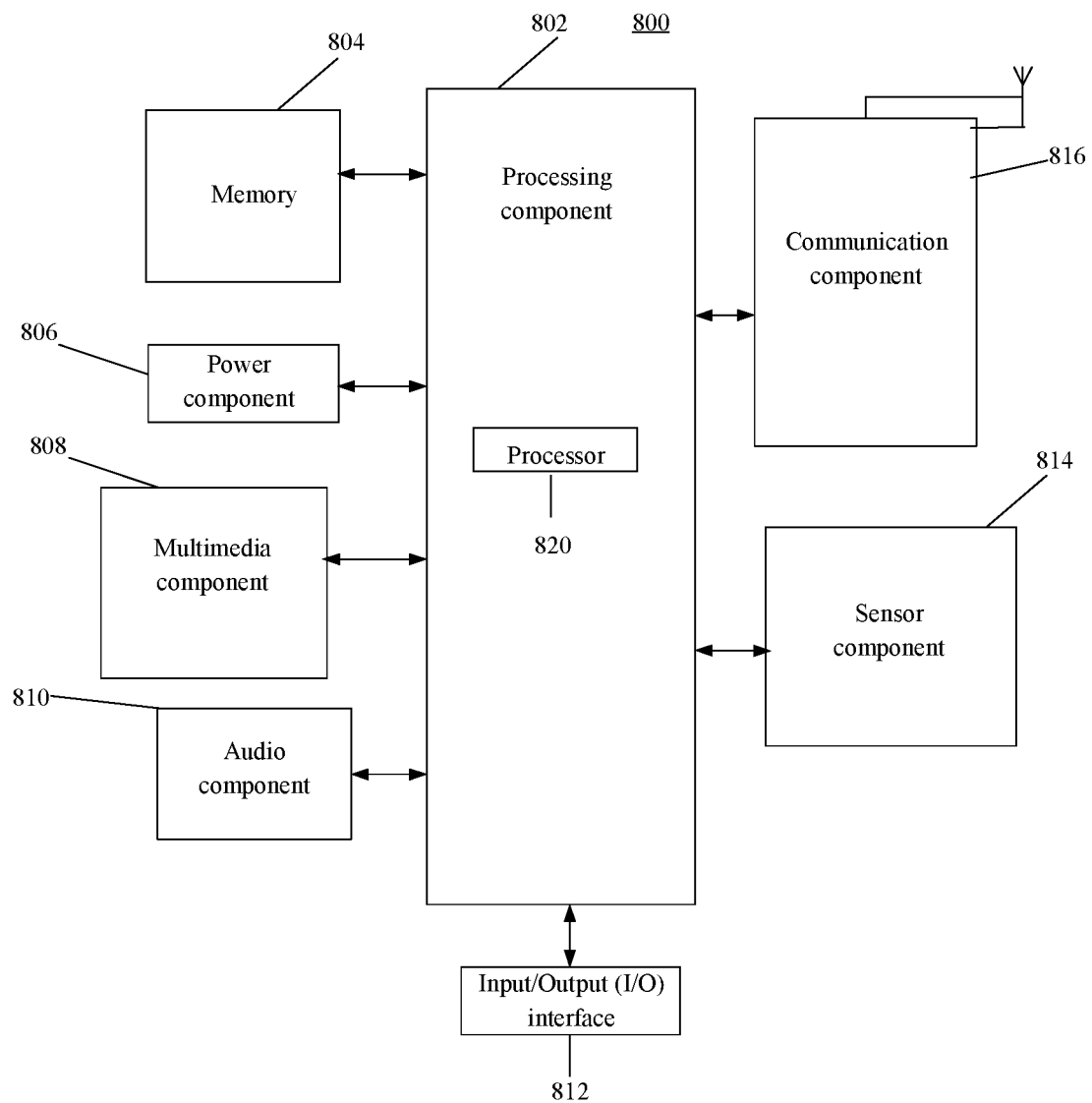
FIG. 13 is a schematic structural diagram of a terminal according to an example of the disclosure.

As shown in FIG. 13, there is provided a structure of a terminal according to an example of the disclosure.

Referring to a terminal 800 shown in FIG. 13, an example provides the terminal 800, which may be a mobile phone, a computer, a digital broadcasting terminal, a messaging device, a game console, a tablet device, a medical device, a fitness device, a personal digital assistant, etc.

Please refer to FIG. 13, the terminal 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as operations associated with display, telephone calls, data communications, camera operations, and recording operations. The processing component 802 may include one or more processors 820 to execute instructions to complete all or part of the steps of the above method. Further, the processing component 802 may include one or more modules, facilitating interaction between the processing component 802 and other components. For example, the processing component 802 may include a multimedia module to facilitate interaction between the multimedia component 808 and the processing component 802.

The memory 804 is configured to store various types of data to support operation at the terminal 800. Examples of these data include instructions for any application or method operating on the terminal 800, contact data, phonebook data, messages, pictures, videos, etc. The memory 804 can be implemented by any type of volatile or non-volatile memory device or their combination, such as a static random-access memory (SRAM), an electrically-erasable programmable read only memory (EEPROM), an erasable programmable read only memory (EPROM), a programmable read-only memory (PROM), a read only memory (ROM), a magnetic memory, a flash memory, a magnetic disk, or an optical disk.

The power component 806 supplies power for various components of the terminal 800. The power component 806 may include a power management system, one or more power sources, and other components associated with generating, managing, and distributing power for the terminal 800.

The multimedia component 808 includes a screen providing an output interface between the terminal 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding, and gestures on the touch panel. The touch sensor can not only sense the boundary of the touch or sliding operation, but also detect the duration and pressure related to the touch or sliding operation. In some examples, the multimedia component 808 includes a front camera and/or a rear camera. When the terminal 800 is in an operation mode, such as a shooting mode or a video mode, the front camera and/or the rear camera can receive external multimedia data. Each of the front camera and the rear camera can be a fixed optical lens system or has a focal length and optical zoom capability.

The audio component 810 is configured to output and/or input audio signals. For example, the audio component 810 includes a microphone (MIC) configured to receive an external audio signal when the terminal 800 is in the operation mode, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and a peripheral interface module, which can be a keyboard, a click wheel, a button, etc. These buttons may include, but are not limited to: a home button, volume buttons, a start button, and a lock button.

The sensor component 814 includes one or more sensors for providing state evaluation of various aspects of the terminal 800. For example, the sensor component 814 can detect an on/off state of the terminal 800 and the relative positioning of the components, for example, the component is a display and a keypad of the terminal 800. The sensor component 814 can also detect the change of the position of the terminal 800 or one component of the terminal 800, the presence or absence of user contact with the terminal 800, the azimuth or acceleration/deceleration of the terminal 800, and the temperature change of the terminal 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the terminal 800 and other devices. The terminal 800 may access a wireless network based on a communication standard, such as Wi-Fi, 2G, or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology and other technologies.

In an example, the terminal 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for performing the above method.

In an example, there is further provided a non-transitory computer-readable storage medium including instructions, such as the memory 804 including instructions, the instructions can be executed by the processor 820 of the terminal 800 to complete the above method. For example, the non-transitory computer-readable storage medium may be an ROM, a random access memory (RAM), a CD-ROM, a magnetic tape, a floppy disk, an optical data storage device, etc.

The terminal may be configured to implement the above method, for example, the method of any of the examples of the disclosure.

Figure 14:
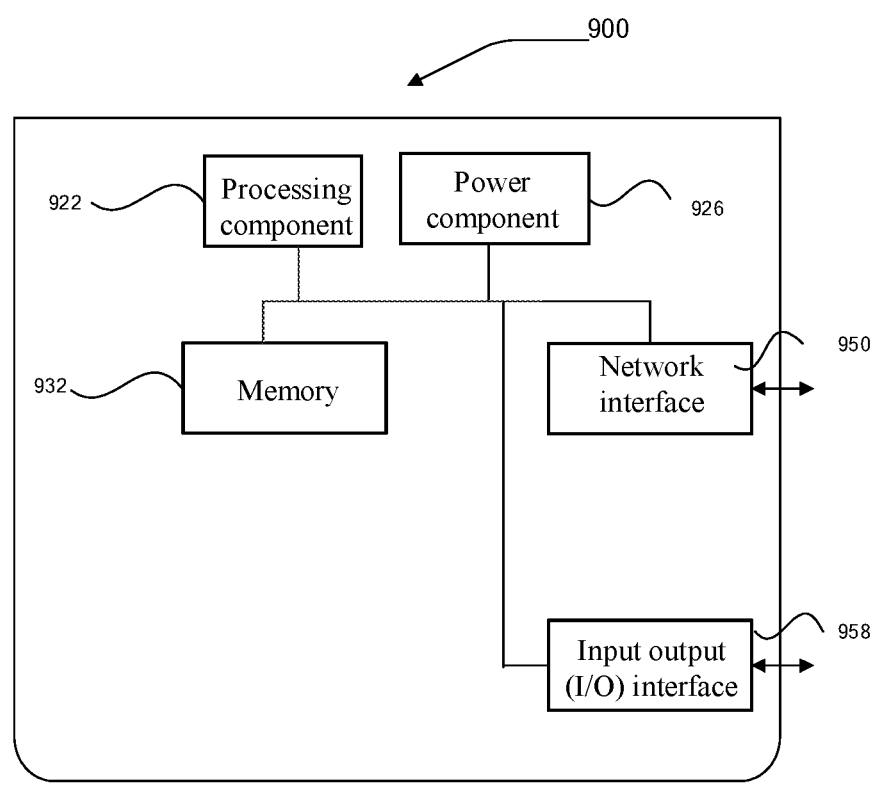
FIG. 14 is a schematic structural diagram of a base station according to an example of the disclosure.

As shown in FIG. 14, there is provided a structure of a base station according to an example of the disclosure. For example, the base station 900 may be provided as a network-side device. Please refer to FIG. 14, the base station 900 includes: a processing component 922, which further includes one or more processors; and a memory resource represented by a memory 932, configured to store instructions, such as applications, executable by the processing component 922. The applications stored in the memory 932 may include one or more modules, each corresponding to a set of instructions. In addition, the processing component 922 is configured to execute instructions to execute any of the methods described above, such as the method of any example of the disclosure.

The base station 900 may further include a power component 926 configured to execute power management of the base station 900, a wired or wireless network interface 950 configured to connect the base station 900 to the network, and an input/output (I/O) interface 958. The base station 900 may operate an operating system stored in the memory 932, such as Windows Server™ Mac OS X™, Unix™, Linux™, FreeBSD™, and the like.

The wireless network interface 950 includes, but is not limited to, the antenna of the above communication apparatus. Other implementations of the present disclosure will be readily conceived by those skilled in the art after taking into account the description and practicing the disclosure disclosed herein. The disclosure aims to cover any variation, use, or adaptive variation of the disclosure, the variation, use, or adaptive variation follows the general principles of the disclosure and includes the known common knowledge or habitual technical means in the art, which is not disclosed by the disclosure. The description and examples are considered only illustrative, and the true scope and spirit of the disclosure are indicated by the following claims.

In the examples of the disclosure, the first information is sent to the base station, and the first information at least includes the request information configured to request a change from the RRC connected state to the RRC disconnected state, and the RRC disconnected state includes the RRC idle state or the RRC inactive state. Here, the terminal may actively send the request information to the base station, requesting to change from the RRC connected state to the RRC disconnected state. Compared with the manner in which the terminal changes from the RRC connected state to the RRC disconnected state only based on the instruction of the base station, the terminal can be in the RRC disconnected state with low power consumption for a longer time, the requirement for reducing the power consumption of the terminal is satisfied, the power consumption of the terminal is reduced, and the standby time of the terminal is prolonged.

It should be understood that the disclosure is not limited to the precise structures that have been described above and shown in the drawings, and that various modifications and changes can be made without departing from the scope. The scope of the disclosure is limited by the appended claims.

What is claimed is:

1. A method for changing a radio resource control (RRC) state, performed by a terminal, the method comprising:
    sending first information to a base station, wherein the first information at least comprises request information configured to request a change from an RRC connected state to an RRC disconnected state, and the RRC disconnected state comprises an RRC idle state or an RRC inactive state;
    wherein sending the first information to the base station comprises: sending the first information to the base station in response to a requirement for reducing the power consumption of the terminal;
    wherein the method further comprises at least one of:
    determining that there is the requirement for reducing the power consumption in response to a screen of the terminal being in an off state; or
    determining that there is the requirement for reducing the power consumption in response to the terminal playing local cached multimedia information;
    wherein determining that there is the requirement for reducing the power consumption in response to the screen of the terminal being in the off state comprises: determining that there is the requirement for reducing the power consumption in response to the screen of the terminal being in the off state within a preset time period, wherein a usage frequency of the terminal within the preset time period is lower than a usage frequency of the terminal outside the preset time period.

2. The method according to claim 1, wherein
sending the first information to the base station comprises:
sending an RRC signaling carrying the first information to the base station;
wherein the RRC signaling carrying the first information is a UEAssistanceInformation signaling, and the UEAssistanceInformation signaling comprises a ReleaseRequest information unit, and the ReleaseRequest information unit carries the first information.

3. The method according to claim 1, wherein the first information further comprises access information, and the access information is configured to enable the terminal to access a wireless network after changing to the RRC disconnected state;
wherein the access information comprises at least one of:
wireless access network information configured to indicate a type of the wireless network to which the terminal requests to access; or
access frequency information configured to indicate a frequency in which the terminal requests to access.

4. The method according to claim 1, further comprising:
receiving indication information sent, based on the first information, by the base station; and
changing from the RRC connected state to the RRC disconnected state in response to the indication information instructing the terminal to change from the RRC connected state to the RRC disconnected state;
wherein receiving the indication information sent, based on the first information, by the base station, comprises:
receiving an RRC signaling carrying the indication information sent, based on the first information, by the base station;
wherein the RRC signaling carrying the indication information is an RRC Release signaling;
wherein the RRC Release signaling comprises a RedirectedCarrierInfo unit, and the RedirectedCarrierInfo unit carries the indication information.

5. The method according to claim 4, wherein the terminal can be connected to a first network and a second network in the RRC connected state; and
the method further comprises:
residing in the second network after changing to the RRC disconnected state, wherein the power consumption for residing in the second network is lower than the power consumption for residing in the first network.

6. The method according to claim 1, wherein before sending the first information to the base station, the method further comprises:
sending reporting capability information to the base station, wherein the reporting capability information is at least configured to indicate whether the terminal has a capability of reporting the first information;
wherein sending the reporting capability information to the base station comprises: sending an RRC signaling carrying the reporting capability information to the base station;
wherein the RRC signaling carrying the reporting capability information is a UE-NR-Capability signaling.

7. The method according to claim 6, further comprising:
receiving configuration information sent by the base station according to the reporting capability information; and
wherein sending the first information to the base station comprises:
sending the first information to the base station according to the configuration information in response to determining that the terminal has the capability of reporting;
wherein receiving the configuration information sent by the base station according to the reporting capability information comprises: receiving an RRC signaling carrying the configuration information sent by the base station according to the reporting capability information;
wherein the RRC signaling carrying the configuration information is an RRCReconfiguration signaling.

8. The method according to claim 7, wherein the configuration information comprises at least one of:
reporting permission information configured to indicate whether the terminal is permitted to report the first information;
blocking timer information configured to indicate a timing duration of a blocking timer, wherein the timing duration is a time interval between two adjacent reporting of the first information;
preset working mode information configured to indicate a working scenario in which the terminal has the requirement for reducing the power consumption;
reporting content information configured to indicate reporting content of the first information; or
reporting format information configured to indicate a reporting format of the first information.

9. A method for changing a radio resource control (RRC) state, performed by a base station, the method comprising:
receiving first information sent by a terminal, wherein the first information at least comprises request information for the terminal to request a change from an RRC connected state to an RRC disconnected state, and the RRC disconnected state comprises an RRC idle state or an RRC inactive state;
wherein receiving the first information sent by the terminal comprises: receiving the first information sent, in response to a requirement for reducing the power consumption of the terminal, by the terminal;
wherein the requirement for reducing the power consumption of the terminal is determined by the terminal through at least one of the following manners:
determining that there is the requirement for reducing the power consumption in response to a screen of the terminal being in an off state; or
determining that there is the requirement for reducing the power consumption in response to the terminal playing local cached multimedia information;
wherein determining that there is the requirement for reducing the power consumption in response to the screen of the terminal being in the off state comprises: determining that there is the requirement for reducing the power consumption in response to the screen of the terminal being in the off state within a preset time period, wherein a usage frequency of the terminal within the preset time period is lower than a usage frequency of the terminal outside the preset time period.

10. The method according to claim 9, wherein
receiving the first information sent by the terminal comprises: receiving an RRC signaling carrying the first information sent by the terminal;
wherein the RRC signaling carrying the first information is a UEAssistanceInformation signaling; and
the UEAssistanceInformation signaling comprises a ReleaseRequest information unit, and the ReleaseRequest information unit carries the first information.

11. The method according to claim 9, wherein the request information comprises access information, and the access information is configured to enable the terminal to access a wireless network after changing to the RRC disconnected state;
  wherein the access information comprises at least one of:
    wireless access network information configured to indicate a type of the wireless network to which the terminal requests to access; or
    access frequency information configured to indicate a frequency in which the terminal requests to access.

12. The method according to claim 9, further comprising:
  sending indication information to the terminal based on the first information, wherein the indication information is configured to instruct the terminal to change from the RRC connected state to the RRC disconnected state;
  wherein sending the indication information to the terminal based on the first information comprises: sending an RRC signaling carrying the indication information to the terminal based on the first information;
  wherein the RRC signaling carrying the indication information is an RRC Release signaling;
  wherein the RRC Release signaling comprises a RedirectedCarrierInfo unit, and the RedirectedCarrierInfo unit carries the indication information.

13. The method according to claim 9, wherein before receiving the first information sent by the terminal, the method further comprises:
  receiving reporting capability information sent by the terminal, wherein the reporting capability information is at least configured to indicate whether the terminal has a capability of reporting the first information;
  wherein receiving the reporting capability information sent by the terminal comprises: receiving an RRC signaling carrying the reporting capability information sent by the terminal;
  wherein the RRC signaling carrying the capability information is a UE-NR-Capability signaling.

14. The method according to claim 13, further comprising:
  sending configuration information to the terminal according to the reporting capability information, wherein the configuration information is configured to enable the terminal to send the first information to the base station;
  wherein sending the configuration information to the terminal according to the reporting capability information comprises: sending an RRC signaling carrying the configuration information to the terminal according to the reporting capability information;
  wherein the RRC signaling carrying the configuration information is an RRCReconfiguration signaling.

15. The method according to claim 14, wherein the configuration information comprises at least one of:
  reporting permission information configured to indicate whether the terminal is permitted to report the first information;
  blocking timer information configured to indicate a timing duration of a blocking timer, wherein the timing duration is a time interval between two adjacent reporting of the first information;
  preset working mode information configured to indicate a working scenario in which the terminal has the requirement for reducing the power consumption;
  reporting content information configured to indicate reporting content of the first information; or
  reporting format information configured to indicate a reporting format of the first information.

16. A communication apparatus, comprising:
  an antenna;
  a memory storing computer-executable instructions; and
  one or more processors connected to the antenna and the memory respectively, wherein the one or more processors, when collectively executing the computer-executable instructions, are configured to control transceiving of the antenna and cause the communication apparatus to act as a terminal and to:
  send first information to a base station, wherein the first information at least comprises request information configured to request a change from a radio resource control (RRC) connected state to an RRC disconnected state, and the RRC disconnected state comprises an RRC idle state or an RRC inactive state;
  wherein sending the first information to the base station comprises: sending the first information to the base station in response to a requirement for reducing the power consumption of the terminal;
  wherein the one or more processors, when collectively executing the computer-executable instructions, further cause the communication apparatus to perform at least one of:
  determining that there is the requirement for reducing the power consumption in response to a screen of the terminal being in an off state; or
  determining that there is the requirement for reducing the power consumption in response to the terminal playing local cached multimedia information;
  wherein determining that there is the requirement for reducing the power consumption in response to the screen of the terminal being in the off state comprises: determining that there is the requirement for reducing the power consumption in response to the screen of the terminal being in the off state within a preset time period, wherein a usage frequency of the terminal within the preset time period is lower than a usage frequency of the terminal outside the preset time period.

17. A non-transitory computer-readable storage medium storing computer-executable instructions, wherein the computer-executable instructions implement the method according to claim 1 when being executed by a processor.

18. A communication apparatus, comprising:
  an antenna;
  a memory storing computer-executable instructions; and
  one or more processors connected to the antenna and the memory respectively, wherein the one or more processors, when collectively executing the computer-executable instructions, are configured to control transceiving of the antenna and cause the communication apparatus to act as a base station and to perform the method according to claim 9.

19. A non-transitory computer-readable storage medium storing computer-executable instructions, wherein the computer-executable instructions implement the method according to claim 9 when being executed by a processor.

* * * * *